United States Patent Office 2,792,358
Patented May 14, 1957

2,792,358

PROCESS FOR BREAKING PETROLEUM EMULSIONS EMPLOYING CERTAIN OXYALKYLATED AMINE-MODIFIED THERMOPLASTIC PHENOL-ALDEHYDE RESINS

Melvin De Groote, University City, Mo., assignor to Petrolite Corporation, Wilmington, Del., a corporation of Delaware No Drawing. Application March 25, 1954,
Serial No. 418,788

10 Claims. (Cl. 252—341)

The present invention is a continuation-in-part of my co-pending application, Serial No. 388,051, filed October 23, 1953.

This invention relates to processes or procedures particularly adapted for preventing, breaking or resolving emulsions of the water-in-oil type, and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the invention.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipe line oil.

Attention is directed to my co-pending application Serial No. 388,051, filed October 23, 1953, which relates to the esterification products of certain carboxylated phenol-aldehyde resins, therein and hereinafter described in detail, and certain amine-modified phenol aldehyde resins, also therein and hereinafter described in detail.

The present invention may be characterized in that it is concerned with a process for breaking petroleum emulsions employing a demulsifier including the above described reaction products of Serial No. 388,051 oxyalkylated by means of certain monoepoxides, hereinafter described in detail.

The products obtained by oxyalkylation with a monoepoxide such as ethylene oxide, propylene oxide, butylene oxide, or the like, can be subjected to further reaction with a product having both a nitrogen group and 1,2-epoxy group, such as 3-dialkylaminoepoxypropane. See U. S. Patent No. 2,520,093, dated August 22, 1950, to Gross.

In the present instance the various condensation products as such or in the form of the free base or in the form of the acetate, may not necesarily be xylene-soluble although they are in many instances. If such compounds are not xylene-soluble the obvious chemical equivalent or equivalent chemical test can be made by simply using some suitable solvent, preferably a water-soluble solvent such as ethylene-glycol diethylether, or a low molal alcohol, or a mixture to dissolve the appropriate product being examined and then mix with the equal weight of xylene, followed by addition of water. Such test is obviously the same for the reason that there will be two phases in vigorous shaking and surface activity makes its presence manifest. It is understood the reference in the hereto appended claims as to the use of xylene in the emulsification test includes such obvious variant.

Reference is made to U. S. Patent No. 2,499,368 dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a fifty-fifty solution in xylene, or its equivalent, when mixed with one to three volumes of water and shaken will produce an emulsion.

For convenience, what is said hereinafter will be divided into seven parts:

Part 1 is concerned with the preparation of the carboxylated resins;

Part 2 is concerned with the phenol-aldehyde resin which is subjected to modification by condensation reaction to yield an amine-modified resin;

Part 3 is concerned with appropriate basic hydroxylated secondary monoamines which may be employed in the preparation of the herein-described amine-modified resins;

Part 4 is concerned with reactions involving the resin, the amine, and formaldehyde to produce specific products or compounds;

Part 5 is concerned with the acylation of esterification reaction involving the carboxylated resins on the one hand and the amine-modified resins on the other hand;

Part 6 is concerned with the reactions involving the intermediates obtained in the manner described in Part 5, preceding, and certain alpha-beta monoepoxides having not over 4 carbon atoms;

Part 7 is concerned with the resolution of petroleum emulsions of the water-in-oil type by means of the previously described chemical compounds or reaction products.

PART 1

U. S. Patent No. 2,571,118, dated October 16, 1951, to De Groote and Keiser, describes a fusible, carboxyl-containing, xylene-soluble, water-insoluble, low-stage phenolaldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

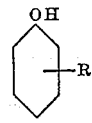

in which R is a hydrocarbon radical having at least 4 and not more than 14 carbon atoms and substituted in one of the positions ortho and para.

The present invention is concerned with the use of such carboxyl-containing resins obtained from a reactant mixture in which 1 to 2 moles of salicylic acid are used in conjunction with 3 to 5 moles of a substituted phenol as described. In most instances the preferred mixture involves a 3:2 or 4:1 molal ratio of substituted phenol to salicylic acid.

Assuming one used 4 moles of amylphenol and one mole of salicylic acid, the resin in its simplest aspect may be represented in an idealized form in the following manner:

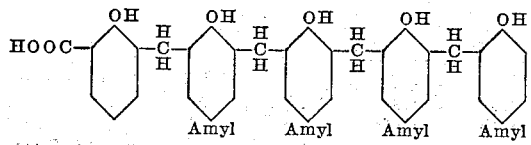

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

If obtained from 2 moles of salicylic acid and 3 moles of amylphenol the corresponding idealized formula would be thus:

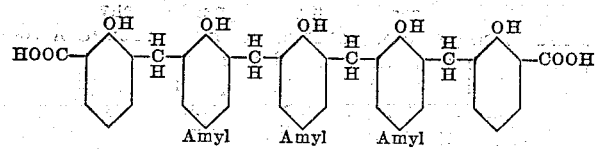

As to the preparation of such resins, purely by way of illustration certain examples are repeated substantially in verbatim form as they appear in said aforementioned U. S. Patent No. 2,571,118. In said patent there is reference to an example which illustrates resinification without use of salicylic acid. For continuity of text this example obviously is included.

Example 1aa

| | Grams |
|---|---|
| Para-tertiary butylphenol | 150 |
| Formaldehyde, 37% | 81 |
| Concentrated Hcl | 1.5 |
| Monoalkyl ($C_{10}$–$C_{20}$, principally $C_{12}$–$C_{14}$ benzene monosulfonic acid sodium salt) | 0.8 |
| Xylene | 100 |

Examples of alkylaryl acids which serve as catalysts and as emulsifiers particularly in the form of sodium salts, include the following

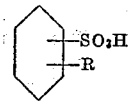

R is an alkyl hydrocarbon radical having 12–14 carbon atoms.

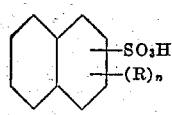

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, I have employed a monoalkylated benzene monosulfonic acid or the sodium salt thereof, wherein the alkyl group contains 10 to 14 carbon atoms. I have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device; one for a separatory funnel or other means of adding reactants; and a thermometer well. In the manipulation employed the separatory funnel insert for adding reactants was not used. The device was equipped with a combination reflux and water-trap apparatus, so that the single piece of equipment could be used as either a reflux condenser or a water trap, depending upon the position of the three-way glass stopcocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one-and-one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylated steps. I have removed also the solvent by conventional means, such as evaporation, distillation, or vacuum distillation, and I customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, I prefer to use a clear resin, but if desired, either type may be employed. (See Example 1a of aforementioned Patent No. 2,571,118.)

Example 2aa

| | | |
|---|---|---|
| Para-tertiary nonylphenol (3.0 moles) | grams | 660 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 41.2% xylene.

The solvent-free resin was pale reddish amber in color, xylene-soluble, clear, and quite soft in consistency. (See Example 18a of aforementioned Patent 2,571,118).

*Example 3aa*

| | |
|---|---|
| Para-tertiary amylphenol (4.0 moles) grams__ | 656 |
| Salicylic acid (1.0 mole) _____do____ | 138 |
| Formaldehyde 37% (5.0 moles) _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution so obtained, contained approximately 45% xylene. The solvent-free resin was reddish amber in color, slightly opaque, obviously xylene-soluble, and somewhat hard to pliable in consistency. See Example 7a of aforementioned Patent 2,571,118).

*Example 4aa*

| | |
|---|---|
| Para-tertiary amylphenol (3.0 moles) grams__ | 492 |
| Salicylic acid (2.0 moles) _____do____ | 276 |
| Formaldehyde 37% (5.0 moles) _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 48.8% xylene. The solvent-free resin was reddish amber in color, clear, xylene-soluble and semi-soft or pliable in consistency. (See Example 13a of aforementioned Patent 2,571,118).

*Example 5aa*

| | |
|---|---|
| Para-secondary butylphenol (3.0 moles) __grams__ | 450 |
| Salicylic acid (2.0 moles) _____do____ | 276 |
| Formaldehyde 37% (5.0 moles) _____do____ | 405 |
| HCl (concentrated) _____ml__ | 40 |
| Xylene _____grams__ | 700 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency. (See Example 14a of aforementioned Patent 2,571,118).

*Example 6aa*

| | |
|---|---|
| Para-octylphenol (3.0 moles) _____grams__ | 618 |
| Salicylic acid (2.0 moles) _____do____ | 276 |
| Formaldehyde 37% _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency. (See Example 16a of aforementioned Patent 2,571,118).

*Example 7aa*

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1aa. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°–110° C., before distilling out water. The amount of water distilled out was 102 cc.

The resin solution so obtained contained approximately 41.2% xylene. The solvent-free resin was reddish-black, clear, xylene-soluble and hard but not brittle in consistency.

(See Example 19a of aforementioned U. S. Patent No. 2,571,118).

PART 2

It is well known that one can readily purchase on the open market, or prepare, fusible, organic solvent-soluble, water-insoluble resin polymers of a composition approximated in an idealized form by the formula $$\underset{R}{\underset{|}{\bigcirc}}\overset{OH}{} \left[ \underset{H}{\overset{H}{\underset{|}{\overset{|}{C}}}} \underset{R}{\underset{|}{\bigcirc}}\overset{OH}{} \underset{H}{\overset{H}{\underset{|}{\overset{|}{C}}}} \right]_n \underset{R}{\underset{|}{\bigcirc}}\overset{OH}{}$$

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl, or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance, paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated-organic solvent-soluble, water-insoluble, low-stage phenol-aldehyde resins having an average molecular weight corresponding to at least 3 and not over 6 phenolic nuclei per resin molecule. The resins are difunctional only in regard to methylol-forming reactivity, are derived by reaction between a difunctional monohydric phenol and an aldehyde having not over 8 carbon atoms and reactive toward said phenol, and are formed in the substantial absence of trifunctional phenols. The phenol is of the formula

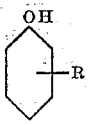

in which R is an aliphatic hydrocarbon radical having at least 4 carbon atoms and not more than 24 carbon atoms, and substituted in the 2,4,6 position;

If one selected a resin of the kind just described previously and reacted approximately one mole of the resin with two moles of formaldehyde and two moles of a basic hydroxylated secondary amine as specified, following the same idealized over-simplification previously referred to, the resultant product might be illustrated thus:

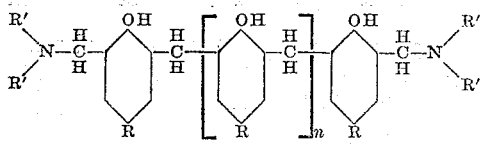

The basic hydroxylated amine may be designated thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

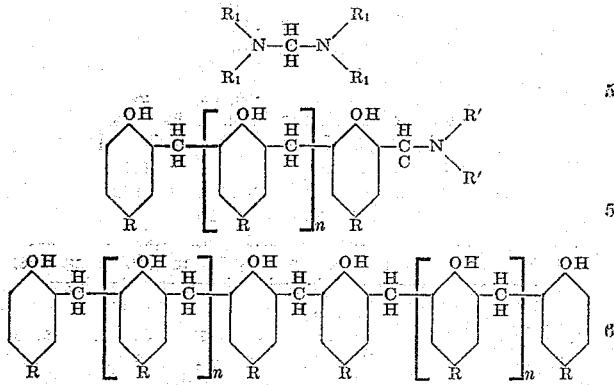

As has been pointed out previously, as far as the resin unit goes one can use a mole of aldehyde other than formaldehyde, such as acetaldehyde, propionaldehyde or butyraldehyde. The resin unit may be exemplified thus:

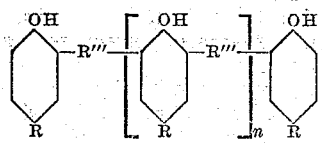

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst in all. It is preferable that the resins employed be substantially neutral. In other words, if prepared by using a strong acid as a catalyst such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Ex. ample number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 780.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 3

As has been pointed out previously the amine herein employed as a reactant is a basic hydroxylated secondary monoamine whose composition is indicated thus:

in which R' represents a monovalent alkyl, alicyclic, arylalkyl radical which may be heterocyclic in a few instances as in a secondary amine derived from furfurylamine by reaction as ethylene oxide or propylene oxide. Furthermore, at least one of the radicals designated by R' must have at least one hydroxyl radical. A large number of secondary amines are available and may be suitably employed as reactants for the present purpose. Among others, one may employ diethanolamine, methyl ethanolamine, dipropanolamine and ethylpropanolamine. Other suitable secondary amines are obtained, of course, by taking any suitable primary amine, such as an alkylamine, an arylalkylamine, or an alicyclic amine, and treating the amine with one mole of an oxyalkylating agent, such as ethylene oxide, propylene oxide, butylene oxide, glycide, or methylglycide. Suitable primary amines which can be so converted into secondary amines, include butylamine, amylamine, hexylamine, higher molecular weight amines derived from fatty acids cyclohexylamine, benzylamine, furfurylamine, etc. In other instances secondary amines which have at least one hydroxyl radical can be treated similarly with an oxyalkylating agent, or, for that matter, with an alkylating agent such as benzylchloride, esters of chloroacetic acid, alkyl bromides, dimethylsulfate, esters of sulfonic acid, etc., so as to convert the primary amine into a secondary amine. Among others, such amines include 2-amino-1-butanol, 2-amino-2-methyl-1-propanol, 2-amino-2-methyl-1,3-propanediol, 2-amino-2-ethyl-1,3-propanediol, and tri(hydroxymethyl)-aminomethane. Another example of such amines is illustrated by 4-amino-4-methyl-2-pentanol.

Similarly, one can prepare suitable secondary amines which have not only a hydroxyl group but also one or more divalent oxygen linkages as part of an ether radical. The preparation of such amines or suitable reactants for preparing them has been described in the literature and particularly in two United States patents, to wit, U. S. Patents Nos. 2,325,514, dated July 27, 1943, to Hester, and 2,355,337 dated August 8, 1944, to Spence. The latter patent describes typical haloalkyl ethers such as $$CH_3OC_2H_4Cl$$

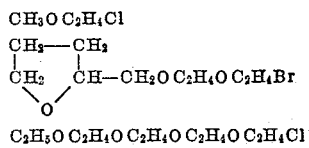

$$C_2H_5OC_2H_4OC_2H_4OC_2H_4OC_2H_4Cl$$

Such haloalkyl ethers can be reacted with ammonia or with a primary amine, such as ethanolamine, propanolamine, monoglycerylamine, etc., to produce a secondary amine in which there is not only present a hydroxyl radical but a repetitious ether linkage. Compounds can be readily obtained which are exemplified by the following formulas:

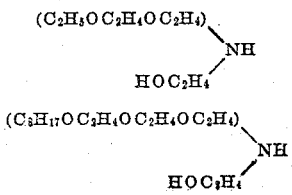

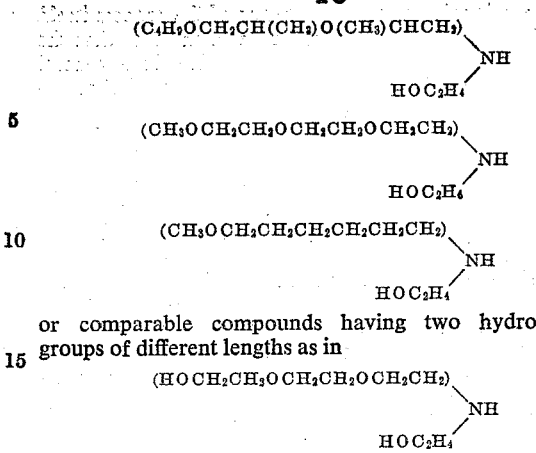

or comparable compounds having two hydroxylated groups of different lengths as in $$(HOCH_2CH_2OCH_2CH_2OCH_2CH_2) \diagdown NH \diagup HOC_2H_4$$

Other examples of suitable amines include alpha-methylbenzylamine and monoethanolamine; also amines obtained by treating cyclohexylmethylamine with one mole of an oxyalkylating agent as previously described; beta-ethylhexyl-butanolamine, diglycerylamine, etc. Another type of amines which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by

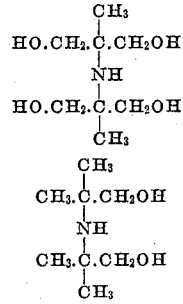

See, also, corresponding hydroxylated amines which can be obtained from rosin or similar raw materials and described in U. S. Patent No. 2,510,063, dated June 6, 1950, to Bried. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Other procedures for production of suitable compounds having a hydroxyl group and a single basic amino-nitrogen atom can be obtained from any suitable alcohol or the like by reaction with a reagent which contains an epoxide group and a secondary amine group. Such reactants are described, for example, in U. S. Patents Nos. 1,977,251 and 1,977,253, both dated October 16, 1934, to Stallmann. Among the reactants described in said latter patent are the following:

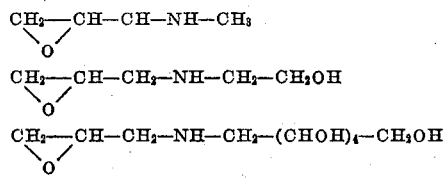

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethyl-ether or ethylene-glycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C., and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol either low boiling or high boiling, might interfere as in the case of oxyalkylation?; and the third factor is this, (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example, 35° C. or slightly lower, provided this initial low temperature stage is employed. The formaldehyde is then added in a suitable form. For reasons pointed out I prefer to use a solution and whether to use a comcercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C., for 4 or 5 hours, or at the most, up to 10–24 hours, I then complete the reaction by raising the temperature up to 150° C., or thereabouts as required. The initial low temperature procedure can be eliminated or reduced to merely the shortest period of time which avoids loss of amine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the secondary amine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of amine and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted amine, if any is present, is another index.

In light of what has been said previously, little more need be said as to the actual procedure employed for the preparation of the herein described condensation products. The following example will serve by way of illustration.

*Example 1b*

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral state had a light amber color.

882 grams of the resin identified as 2a preceding were powered and mixed with 700 grams of xylene. The mixture was refluxed until solution was complete. It was then adjusted to approximately 30° to 35° C., and 210 grams of diethanolamine added. The mixture was stirred vigorously and formaldehyde added slowly. The formaldehyde used was a 37% solution and 160 grams were employed which were added in about 3 hours. The mixture was stirred vigorously and kept within a temperature range of 30° to 45° C. for about 21 hours. At the end of this period of time it was refluxed, using a phase-separating trap and a small amount of aqueous distillate withdrawn from time to time and the presence of unreacted formaldehyde noted. Any unreacted formaldehyde seemed to disappear within approximately 3 hours after the refluxing was started. As soon as the odor of formaldehyde was no longer detectible the phase-separating trap was set so as to eliminate all water of solution and reaction. After the water was eliminated part of the xylene was removed until the temperature reached about 150° C. The mass was kept at this higher temperature for about 3¾ hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or a tacky resin. The overall reaction time was a little over 30 hours. In other instances it has varied from approximately 24 to 36 hours. The time can be reduced by cutting the low temperature period to about 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C. or thereabouts. Usually the mixture yielded a clear solution by the time the bulk of the water, or all of the water, had been removed.

Note that as pointed out previously, this procedure is illustrated by 24 examples in Table II.

preferred resin contains one or two carboxyl groups. A carboxylated resin having one carboxyl group may be reacted with a suitable amine-modified resin so as to combine only one such carboxylated resin molecule. Similarly, the amine-modified resin molecule may combine with at least two such monocarboxylated resin molecules. In some instances as, for example, when derived from diethanolamine or dipropanolamine the amine-

TABLE II

| Ex. No. | Resin used | Amt., grs. | Amine used and amount | Strength of formaldehyde soln. and amt. | Solvent used and amt. | Reaction temp., °C. | Reaction time, (hrs.) | Max. distill. temp., °C. |
|---|---|---|---|---|---|---|---|---|
| 1b | 2a | 882 | Diethanolamine, 210 g | 37%, 162 g | Xylene, 700 g | 22–26 | 32 | 137 |
| 2b | 5a | 480 | Diethanolamine, 105 g | 37%, 81 g | Xylene, 450 g | 21–23 | 28 | 150 |
| 3b | 10a | 633 | ...do | ...do | Xylene, 600 g | 20–22 | 36 | 145 |
| 4b | 2a | 441 | Dipropanolamine, 133 g | 30%, 100 g | Xylene, 400 g | 20–23 | 34 | 146 |
| 5b | 5a | 480 | ...do | ...do | Xylene, 450 g | 21–23 | 24 | 141 |
| 6b | 10a | 633 | ...do | ...do | Xylene, 600 g | 21–28 | 24 | 145 |
| 7b | 2a | 882 | Ethylethanolamine, 178 g | 37%, 162 g | Xylene, 700 g | 20–26 | 24 | 152 |
| 8b | 5a | 480 | Ethylethanolamine, 89 g | 37%, 81 g | Xylene, 450 g | 24–30 | 28 | 151 |
| 9b | 10a | 633 | ...do | ...do | Xylene, 600 g | 22–25 | 27 | 147 |
| 10b | 13a | 473 | Cyclohexylethanolamine, 143 g | 30%, 100 g | Xylene, 450 g | 21–31 | 31 | 146 |
| 11b | 14a | 511 | ...do | 37%, 81 g | ...do | 22–23 | 36 | 148 |
| 12b | 15a | 665 | ...do | ...do | Xylene, 550 g | 20–24 | 27 | 152 |
| 13b | 2a | 441 | $C_2H_5OC_2H_4OC_2H_4$\NH, 176 g / $HOC_2H_4$ | ...do | Xylene | 21–25 | 24 | 150 |
| 14b | 5a | 480 | $C_2H_5OC_2H_4OC_2H_4$\NH, 176 g / $HOC_2H_4$ | ...do | Xylene, 450 g | 20–26 | 26 | 146 |
| 15b | 9a | 595 | $C_2H_5OC_2H_4OC_2H_4$\NH, 176 g / $HOC_2H_4$ | ...do | Xylene, 550 g | 21–27 | 30 | 147 |
| 16b | 2a | 441 | $HOC_2H_4OC_2H_4OC_2H_4$\NH, 192 g / $HOC_2H_4$ | ...do | Xylene, 400 g | 20–22 | 30 | 148 |
| 17b | 5a | 480 | $HOC_2H_4OC_2H_4OC_2H_4$\NH, 192 g / $HOC_2H_4$ | ...do | ...do | 20–25 | 28 | 150 |
| 18b | 14a | 511 | $HOC_2H_4OC_2H_4OC_2H_4$\NH, 192 g / $HOC_2H_4$ | ...do | Xylene, 500 g | 21–24 | 32 | 149 |
| 19b | 22a | 498 | $HOC_2H_4OC_2H_4OC_2H_4$\NH, 192 g / $HOC_2H_4$ | ...do | Xylene, 450 g | 22–25 | 32 | 153 |
| 20b | 23a | 542 | $CH_3(OC_2H_4)_3$\NH, 206 g / $HOC_2H_4$ | 30%, 100 g | Xylene, 500 g | 21–23 | 36 | 151 |
| 21b | 25a | 547 | $CH_3(OC_2H_4)_3$\NH, 206 g / $HOC_2H_4$ | ...do | ...do | 25–30 | 34 | 148 |
| 22b | 2a | 441 | $CH_3(OC_2H_4)_3$\NH, 206 g / $HOC_2H_4$ | ...do | Xylene, 400 g | 22–23 | 31 | 146 |
| 23b | 26a | 505 | Decylethanolamine, 201 g | 37%, 81 g | Xylene, 500 g | 22–27 | 24 | 145 |
| 24b | 27a | 391 | Decylethanolamine, 100 g | 30%, 50 g | Xylene, 300 g | 21–25 | 26 | 147 |

PART 5

Needless to say, the two prior reactants can be combined readily by means of an acylation reaction and more specifically an esterification reaction. It has been pointed out previously that the amine-modified condensate must have at least 2 and may have more than 2 alkanol hydroxyl groups. It is to be noted the carboxylated resins may be monofunctional, difunctional or even may contain 3 or more carboxyls. For practical purposes the modified resin may be combined with as many as 4 monocarboxylated resin units.

When the carboxylated resin contains more than one carboxyl group, for instance, two carboxyl groups, the same combination as above indicated may take place but in addition there may be formed linear polymers and also polymers showing cross-linking, at least to some modest degree. Modest cross-linking is not objectionable provided the resultant product is still soluble in an organic solvent and is thermoplastic. The objective is to obtain a product which, regardless of its other uses, is readily susceptible to oxyalkylation. Thus, soluble complicated resins have been obtained using dicarboxylated resins and compounds obtained from dialkanolamines, in which structures other than linear polymer structure appears.

Returning to the over-simplified presentation of the amine-modified resin and particularly one obtained from diethanolamine, for example, or for that matter from ethylethanolamine, the product would be illustrated thus:

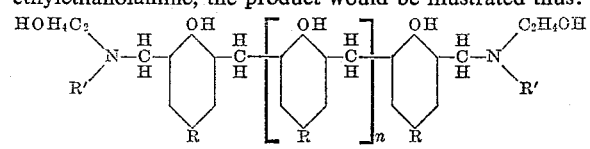

in which R' is alkyl or alkanol.

There has been presented earlier an idealized formula for the carboxylated resin. The terminal part of the molecule may be shown thus:

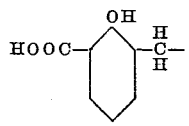

Without attempting to include all ramifications and particularly where the amine radical is polyhydroxylated, it becomes apparent that in the use of a simple monohydroxylated amine such as ethylethanolamine, in the manufacture of the amine-modified resin, the radical which has been shown previously becomes part of an ester linkage which may be illustrated thus:

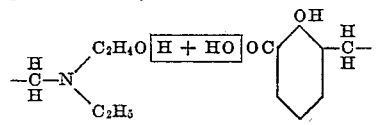

The compounds can be prepared without the use of any solvent although for obvious reasons it is preferable that a solvent be used. Indeed, it is specified that the resins employed be xylene-soluble. In every instance xylene was used as a solvent but obviously any other comparable solvent such as ethylbenzene, cymene, or the like, can be employed. However, xylene seems to be very suitable.

The general procedure was to dissolve the carboxylated resin in xylene as indicated and then add the amine-modified resin using a reflux condenser with a phase-separating trap. The reaction was conducted for a period of time at a comparatively low temperature, for instance somewhere above the boiling point of water, and then gradually was taken to a higher temperature, for instance, 140° C. to 150° C. There were two reasons for this procedure. An effort was made to limit the reaction as far as possible to the acylation (esterification) and to avoid more complicated reactions such as possible ring formation and the like. Secondly, the effort was made in all instances to avoid gelation or cross-linking so as to yield an insoluble product. If the resultant of reaction became thick and showed incipient cross-linking the reaction was stopped provided the theoretical amount of water, or approximately the theoretical amount, had been eliminated. If there happened to be no danger of cross-linking or ring formation in light of the particular reactants selected, any suitable temperature could be employed.

Water of reaction as formed was eliminated by means of the phase-separating trap and if required the xylene or other solvent employed was eliminated so as to raise the temperature sufficiently high to eliminate the theoretical water of esterification or approximately this amount.

It is not necessary that esterification eliminate all carboxyl radicals or all hydroxyl radicals. Thus, in the use of a carboxylated resin having 2 or more carboxyl radicals if desired the reaction may be conducted so that only one carboxyl radical is reacted. Thus, the residual product may have a free carboxyl radical, or a free carboxyl radical and a free hydroxyl radical. In such instances where all the carboxyl radicals are esterified there may be free hydroxyl radicals, or even where only one carboxyl group is reacted.

The entire procedure is conventional and, in fact, has been described in the formation of other esters of esterified products using carboxylated resins.

*Example 1c*

The carboxylated resin employed was 4aa. The amine-modified resin employed was 1b. The molecular weight of carboxylated resin 4aa was 846. A gram mole of the resin, to wit, 846 grams, were reacted with 1120 grams of the amine-modified resin (xylene-free basis). The amount of xylene present both as a solvent for the two reactants and as added solvent was 983 grams. The mixture started to reflux at approximately 108° C. and rose rapidly to about 120° C. Xylene was then withdrawn until a temperature of about 160° to 162° C. was reached. The mixture was allowed to reflux at this temperature for approximately fixe hours during which time period 18 grams of water were eliminated. The reaction was stopped and the xylene which had been withdrawn during the reflux period was returned to the reaction mass.

This example and other examples are presented in Table III following.

TABLE III

| Ex. No. | Carboxylated resin Ex. No. | Mol. ratio | Mol. wt. | Amt. used, grams | Amine modified resin | Wt. of amine modified resin (xylene-free basis), grams | Solvent (xylene) at start, grams | Time, hrs. | Max. temp., °C. | Water out, ml. |
|---|---|---|---|---|---|---|---|---|---|---|
| 1c | 4aa | 1:1 | 846 | 846 | 1b | 1,120 | 983 | 3 | 162 | 18 |
| 2c | 4aa | 1:2 | 846 | 846 | 1b | 2,240 | 1,543 | 6 | 160 | 36 |
| 3c | 4aa | 1:1 | 846 | 846 | 2b | 1,230 | 1,038 | 5 | 162 | 18 |
| 4c | 4aa | 1:2 | 846 | 846 | 2b | 2,460 | 1,653 | 7 | 165 | 36 |
| 5c | 4aa | 1:1 | 846 | 846 | 3b | 1,545 | 1,195 | 5 | 163 | 18 |
| 6c | 4aa | 1:2 | 846 | 846 | 3b | 3,090 | 1,968 | 7 | 162 | 36 |
| 7c | 4aa | 1:1 | 846 | 846 | 4b | 1,165 | 1,005 | 5 | 163 | 18 |
| 8c | 4aa | 1:2 | 846 | 846 | 4b | 2,330 | 1,588 | 6 | 161 | 36 |
| 9c | 4aa | 1:1 | 846 | 846 | 5b | 1,275 | 1,060 | 5 | 164 | 18 |
| 10c | 4aa | 1:2 | 846 | 846 | 5b | 2,550 | 1,698 | 7 | 160 | 36 |
| 11c | 3aa | 1:1 | 872 | 872 | 1b | 1,120 | 996 | 6 | 164 | 18 |
| 12c | 3aa | 1:1 | 872 | 872 | 5b | 1,275 | 1,074 | 6.5 | 166 | 18 |
| 13c | 3aa | 1:1 | 872 | 872 | 6b | 1,590 | 1,231 | 6 | 166 | 18 |
| 14c | 6aa | 1:1 | 872 | 872 | 1b | 1,120 | 1,046 | 7 | 165 | 18 |
| 15c | 6aa | 1:1 | 872 | 872 | 2b | 1,230 | 1,101 | 7 | 165 | 18 |
| 16c | 6aa | 1:1 | 972 | 972 | 6b | 1,590 | 1,281 | 7 | 166 | 18 |
| 17c | 2aa | 1:2 | 1,014 | 1,014 | 1b | 2,240 | 1,627 | 8 | 164 | 36 |
| 18c | 2aa | 1:2 | 1,014 | 1,014 | 2b | 2,460 | 1,737 | 8 | 163 | 36 |
| 19c | 2aa | 1:2 | 1,014 | 1,014 | 3b | 3,090 | 2,052 | 8 | 168 | 36 |
| 20c | 4aa | 1:1 | 846 | 846 | 1b | 1,120 | 983 | 9 | 160 | 36 |
| 21c | 4aa | 1:1 | 846 | 846 | 2b | 1,230 | 1,038 | 9 | 165 | 36 |
| 22c | 4aa | 1:1 | 846 | 846 | 3b | 1,545 | 1,195 | 8 | 167 | 36 |
| 23c | 4aa | 1:1 | 846 | 846 | 4b | 1,165 | 1,005 | 9 | 164 | 36 |
| 24c | 4aa | 1:1 | 846 | 846 | 5b | 1,275 | 1,275 | 12 | 168 | 36 |
| 25c | 4aa | 1:1 | 846 | 846 | 6b | 1,590 | 1,525 | 11 | 170 | 36 |

Note that in the last six examples a mole of dicarboxylated resin was reacted mole-for-mole with a polyhydroxylated amine-modified resin. The reaction was continued in an effort to produce a linear polymer, to wit, to esterify both carboxyls of the carboxylated resin. The reaction probably ended with free hydroxyl groups and perhaps a structure more complicated, at least to some degree than a simple linear polymer. Note the ratio of reactants in 20c is identical with that in 1c but in 20c the amount of water eliminated was approximately 36 grams as compared with 18 grams in 1c.

PART 6

At the present time there are available a number of alkylene oxides, particularly ethylene oxide, or propylene oxide and butylene oxide, either as a single isomer or as a mixture of isomers. Glycide is available, or readily prepared. The same applies to methylglycide.

Oxyalkylation with any of the aforementioned alkylene oxides is comparatively simple in light of present day knowledge. In fact, it is stated briefly in U. S. Patent No. 2,636,038, dated April 21, 1953, to Brandner, in the following language: ". . . The compounds . . . are prepared by the addition reaction between alkylene oxides and substituted oxazolines of the group named hereinbefore. The addition reaction is advantageously carried out at elevated temperature and pressure and in the presence of an alkaline catalyst."

As to a more complete description of oxyalkylation procedure reference is made to U. S. Patent 2,629,706, dated February 24, 1953, to De Groote and Keiser. See particularly the subject matter which appears in column 7 of said patent.

Propylene oxide and butylene oxide react somewhat more slowly than ethylene oxide and may require a somewhat higher temperature, somewhat greater agitation, or an increased amount of alkaline catalyst, such as finely powdered sodium hydroxide or sodium methylate. If the product to be subjected to oxyalkylation is xylene-soluble or soluble in any one of a number of inert solvents, there is no particular difficulty involved. The same is true if the product is a liquid at oxyalkylation temperatures. If it is not soluble or a liquid then in some cases initial oxyalkylation can be accomplished by means of an alkylene carbonate, such as ethylene carbonate or propylene carbonate which has a solubility effect as well as acting as an oxyalkylation agent. As soon as a suitable product is obtained by the use of a carbonate further reaction can be completed with the oxide. An alternate procedure sometimes employed with insoluble materials is to reduce the products to an extremely finely ground powder and oxyalkylate during suspension using particularly vigorous agitation.

All these procedures have been described repeatedly in the literature and, as a matter of fact, suitable operational directions are available from any one of several makers of alkylene oxides.

Example 1d

Due to their ready availability, the bulk of the oxyalkylation derivatives were prepared from ethylene oxide, propylene oxide, butylene oxide, or a mixture of the same. Generally speaking, the autoclaves or oxyalkylators employed ranged from approximately 2 gallons in size to approximately 20 gallons in size. The general procedure was to start with a fairly small sample; for instance, approximately 2000 grams, of the product to be oxyalkylated and 1000 grams of a solvent such as xylene, or a high-boiling aromatic solvent, or the diethylether of ethyleneglycol, or a mixture of these solvents. Powdered caustic soda, or sodium methylate, were added as a catalyst in an amount generally not over 2%, and more catalyst was added if the amount dropped to ½% or less. Initial oxyalkylation generally started by adding 50% by weight, 100% by weight, 200% by weight, 300% by weight, 500% by weight, etc., until at least ten times as much oxide had been added, at least in some examples. Excellent compounds or suitable raw materials have been obtained by adding as much as 50 parts by weight of oxide to one part of the initial reactant. In some instances the same examples were repeated and then reacted with one or more oxides; for instance, in the table which follows there are examples where an oxyethylated product was oxypropylated subsequently, or vice-versa. Comparatively small samples, for instance, one to five grams, were taken at various stages and tested for emulsifiability factor and also for demulsifying effect on crude oil emulsions. The tabular data do not reflect the slight discrepancy due to sample withdrawal.

More specifically then, 1.12 kilograms of the acylation derivative previously identified as Example 1c, were mixed with slightly less than an equal weight of solvent (being xylene in this series). The mixture was placed in a small autoclave together with 22.5 grams of finely powdered caustic soda, and stirred, and the temperature raised to approximately 112° C. 1.12 kilograms of ethylene oxide were added in approximately 90 minutes. The pressure during the oxyalkylation was about 30 to 35 pounds per square inch. The resultant product was a fluid having a reddish black cast. Except for the withdrawal of a few grams for examination, the product was then subjected to further oxyalkylation with another 1.12 kilograms of ethylene oxide and without the addition of any more catalyst or any more solvent.

Note what is said in regard to these examples and subsequent examples in the text immediately following, and in the tables.

A number of additional examples appear in tabular form in the five tables immediately following, to wit, Tables IV, V, VI, VII and VIII. These are self-explanatory, particularly in regard to the first three tables. The last two require a little more careful examination. This is due to an effort to condense the data and not burden the text with an unduly large volume of detail.

Due to the fact that various size quantities are used the ratios sometimes appear in grams or kilograms and sometimes in pounds. When pounds are used the designation "#" is included.

In Tables IV, V and VI successive stages of oxyalkylation are shown. Small samples of a few grams were withdrawn and tested for solubility and also for demulsification effectiveness. The withdrawal of such small samples was ignored. In some instances the example was repeated and used subsequently for reaction with one or more other oxides. In some instances the product so obtained in the first stage of oxyalkylation represented a comparatively large quantity and was subdivided perhaps into one-half or even a smaller fraction, and then this smaller fraction only subjected to oxyalkylation with another oxide. As previously noted, no further explanation is required in regard to the first three tables.

In the fourth table, Table VII, it is to be noted that Example 1g is derived from Example 4d. Referring to Example 4d it will be noted this was derived originally from oxyalkylation-susceptible compound Example 1c. In Example 4d, oxyalkylation-susceptible compound Example 1c had already been treated with ethylene oxide. Thus, in Table VII, although the oxyalkylation-susceptible compound is properly designated as Example 4d for the reason it is now the reactant subjected to oxybutylation, the oxyalkylation-susceptible compound as far as reference to weight goes (in this instance 450 grams) goes back to the original compound Example 1c. This is obvious, and is even more obvious for the reason that it is subsequently emphasized in connection with the weight ratio, as explained subsequently.

It will be noted also that in the fourth column in Table VII the oxide used is marked as indicated and in each instance the oxide employed in this second stage is shown, in the first instance in Table VII being butylene oxide in the second instance being ethylene oxide, and in the last instance being propylene oxide.

Bearing in mind what is said in regard to Example 1g being derived from Example 4d, which in turn was derived from Example 1c plus ethylene oxide, it should be noted that this table does not, as far as the first four columns go, reflect the amount of oxide which was added in the initial or earlier stage. As previously noted, this does not cause confusion and, in fact, permits holding the data to a minimum in light of what is said next.

Referring now to columns seven, eight, nine and ten which are concerned with composition at the end, it will be noted that these data do take into consideration the amount of oxide added initially as well as the oxide during the second stage. Thus, although this shows the butylene oxide added it also shows the original ethylene oxide as representing the 3.5 to 1 weight ratio based on the oxyethylation of the first stage. This can be stated perhaps more simply in the following way: On initial examination the table shows that Example 1g was derived from Example 4d. As to the composition of Example 4d one need only note that in the seventh column it shows that 450 grams of butylene oxide were added and the weight ratio to the oxyalkylation-susceptible compound Example 1c was one-to-one, but it also shows that the weight ratio of the ethylene oxide at the same stage was 3.5 to 1. Thus, without even checking back to a prior table it is obvious the initial material, Example 4d, subjected to a second oxyalkylation step, consisted of a product in which one part of the oxyalkylation-susceptible compound was combined with 3.5 pounds by weight of ethylene oxide, prior to oxybutylation.

All the data in Tables VII and VIII are presented in the same way. We find this is the most simple and concise tabular presentation that yet has been developed after a considerable series of experimentations, and reports in table form. This is true even where three oxides were employed as for instance in Example 1h in Table VIII. Example 1h was obtained from Example 5g in Table VII. Example 5g, as indicated, was obtained by an oxybutylation of Example 1g, and Example 1g, as previously noted, was obtained from Example 4d. The preparation of Example 4d from Example 1c has been discussed in considerable detail in the previous text. Again it is to be noted that in the tables the ratios of the oxide to the initial product prior to oxyalkylation is shown so there is no question as to the composition of each example although considerable data have been presented in what is a comparatively condensed and readily understandable form.

Note what is said in regard to the color of the products in the tables. For most industrial purposes there is no objection to the color. The products can be decolorized by conventional procedure, using bleaching earths, filtering clays, charcoal, or the like. A trace or small amount of catalyst, if present, can be removed for most purposes by the mere addition of a comparable amount of hydrochloric acid or by any other suitable means.

TABLE IV

| Ex. No. | Composition before—Amount of OSC,[1] catalyst and solvent constant before and after oxyalkylation | | | | Composition at end | | | | Operating conditions | | | End product—Color and physical state |
|---|---|---|---|---|---|---|---|---|---|---|---|---|
| | OSC[1] Ex. No. | OSC,[1] grams | Oxide used, EtO, grams | Catalyst, NaOH, grams | Xylene solvent, grams | Oxide used, EtO, grams | Weight ratio | | | Max. pres., p. s. i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1d | 1c | 1.12 Kg. | 0 Kg. | 22.5 | 0.98 Kg. | 1.12 Kg. | 1.0 | | | 30-35 | 110-115 | 1½ | Reddish black vis. liq. |
| 2d | 1d | 1.12 | 1.12 | 22.5 | 0.98 | 2.70 | 2.5 | | | 30-35 | 110-115 | 1½ | Do. |
| 3d | 2d | 1.12 | 2.70 | 22.5 | 0.98 | 3.36 | 3.0 | | | 30-35 | 110-115 | ½ | Do. |
| 4d | 3d | 1.12 | 3.36 | 22.5 | 0.98 | 3.92 | 3.5 | | | 30-35 | 110-115 | ¾ | Do. |
| 5d | 4d | 1.12 | 3.92 | 22.5 | 0.98 | 4.65 | 4.15 | | | 30-35 | 110-115 | 1 | Very viscous. |
| 6d | 5d | 1.12 | 4.65 | 22.5 | 0.98 | 6.72 | 6.0 | | | 30-35 | 110-115 | 1½ | Do. |
| 7d | 6d | 1.12 | 6.72 | 22.5 | 0.98 | 7.84 | 7.0 | | | 30-35 | 110-115 | 1½ | Heavy viscous. |
| 8d | 7d | 1.12 | 7.84 | 22.5 | 0.98 | 8.96 | 8.0 | | | 30-35 | 110-115 | 2 | Semi solid. |
| 9d | 8c | 2.33 Kg. | 0 Kg. | 465 | 1.5 Kg. | 2.33 | 1.0 | | | 30-35 | 110-115 | 2 | Greenish black vis. liq. |
| 10d | 9d | 2.33 | 2.33 | 465 | 1.5 | 4.66 | 2.0 | | | 30-35 | 110-115 | 2 | Do. |
| 11d | 10d | 2.33 | 4.66 | 465 | 1.5 | 6.99 | 3.0 | | | 30-35 | 110-115 | 2½ | Do. |
| 12d | 11d | 2.33 | 6.99 | 465 | 1.5 | 18.64 | 8.0 | | | 30-35 | 110-115 | 4½ | Heavy viscous. |
| 13d | 12d | 2.33 | 18.64 | 465 | 1.5 | 19.80 | 8.5 | | | 30-35 | 110-115 | ½ | Do. |
| 14d | 13d | 2.33 | 19.80 | 465 | 1.5 | 20.96 | 9.0 | | | 30-35 | 110-115 | 1 | Heavy vis. to semi-solid. |
| 15d | 14d | 2.33 | 20.96 | 465 | 1.5 | 22.12 | 9.5 | | | 30-35 | 110-115 | 1¼ | Semisolid to solid. |

[1] Oxyalkylation-susceptible compound.

TABLE V

| Ex. No. | Composition before—Amount of OSC,[1] catalyst and solvent constant before and after oxyalkylation | | | | Composition at end | | | | Operating conditions | | | End product—Color and physical state |
|---|---|---|---|---|---|---|---|---|---|---|---|---|
| | OSC,[1] Ex. No. | OSC[1] grams | Oxide used, PrO, grams | Catalyst, NaOH, grams | Xylene solvent, grams | Oxide used, PrO, grams[2] | Weight ratio | | | Max. pres., p. s. i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1e | 10c | 5.0# | 0.0# | 225 | 5.0# | 40.0# | | 8.0 | | 30-35 | 110-115 | 5 | Dark amber vis. liq. |
| 2e | 1e | 5.0 | 40.0 | 225 | 5.0 | 50.0 | | 10.0 | | 30-35 | 110-115 | 1 | Do. |
| 3e | 2e | 5.0 | 50.0 | 225 | 5.0 | 60.0 | | 12.0 | | 30-35 | 110-115 | 1½ | Do. |
| 4e | 3e | 5.0 | 60.0 | 225 | 5.0 | 75.0 | | 15.0 | | 30-35 | 110-115 | 1¾ | Do. |
| 5e | 4e | 2.5 | 37.5 | 112.5 | 2.5 | 50.0 | | 20.0 | | 30-35 | 110-115 | 2 | Do. |
| 6e | 5e | 2.5 | 50.0 | 112.5 | 2.5 | 62.5 | | 25.0 | | 30-35 | 110-115 | 2 | Do. |
| 7e | 6e | 2.5 | 62.5 | 112.5 | 2.5 | 70.0 | | 28.0 | | 30-35 | 110-115 | 2 | Do. |
| 8e | 7e | 2.5 | 70.0 | 112.5 | 2.5 | 75.0 | | 30.0 | | 30-35 | 110-115 | 2¾ | Do. |
| 9e | 12c | 10.0 | 0.0 | 450 | 10.0 | 70.0 | | 7.0 | | 30-35 | 110-115 | 4½ | Do. |
| 10e | 9e | 10.0 | 70.0 | 450 | 10.0 | 80.0 | | 8.0 | | 30-35 | 110-115 | ¾ | Do. |
| 11e | 10e | 5.0 | 40.0 | 225 | 5.0 | 80.0 | | 16.0 | | 30-35 | 110-115 | 3 | Do. |
| 12e | 11e | 5.0 | 80.0 | 225 | 5.0 | 100.0 | | 20.0 | | 30-35 | 110-115 | 2 | Do. |
| 13e | 12e | 2.5 | 50.0 | 112.5 | 2.5 | 62.5 | | 25.0 | | 30-35 | 110-115 | 2 | Do. |
| 14e | 13e | 2.5 | 62.5 | 112.5 | 2.5 | 75.0 | | 30.0 | | 30-35 | 110-115 | 2¾ | Do. |
| 15e | 14e | 2.5 | 75.0 | 112.5 | 2.5 | 80.0 | | 32.0 | | 30-35 | 110-115 | 1 | Do. |

[1] Oxyalkylation-susceptible compound.
[2] In some instances weights change from gram basis to pound basis. Such change in unit is obvious.

TABLE VI

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, BuO, grams | Catalyst, NaOH, grams | Xylene solvent, grams | Oxide used, BuO, grams | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1f | 20c | 2.5 Kg. | 0 Kg. | 250 | 2.0 Kg. | 0.5 Kg. | | | 0.2 | 30–35 | 120–130 | ¾ | Reddish black vis. liq. |
| 2f | 1f | 2.5 | .5 | 250 | 2.0 | 1.25 | | | 0.5 | 30–35 | 120–130 | 1½ | Do. |
| 3f | 2f | 2.5 | 1.25 | 250 | 2.0 | 2.5 | | | 1.0 | 30–35 | 120–130 | 1½ | Do. |
| 4f | 3f | 2.5 | 2.5 | 250 | 2.0 | 5.0 | | | 2.0 | 30–35 | 120–130 | 3¼ | Do. |
| 5f | 4f | 2.5 | 5.0 | 250 | 2.0 | 8.75 | | | 3.5 | 30–35 | 120–130 | 4 | Do. |
| 6f | 22c | 3.0 | 0 | 275 | 4.0 | 1.5 | | | .5 | 30–35 | 120–130 | 1½ | Do. |
| 7f | 6f | 3.0 | 1.5 | 275 | 4.0 | 3.0 | | | 1.0 | 30–35 | 120–130 | 1¾ | Do. |
| 8f | 7f | 3.0 | 3.0 | 275 | 4.0 | 6.0 | | | 2.0 | 30–35 | 120–130 | 3½ | Do. |
| 9f | 8f | 3.0 | 6.0 | 275 | 4.0 | 9.0 | | | 3.0 | 30–35 | 120–130 | 3½ | Do. |
| 10f | 9f | 3.0 | 9.0 | 275 | 4.0 | 15.0 | | | 5.0 | 30–35 | 120–130 | 7 | Do. |
| 11f | 14c | 5.5 | 0 | 550 | 5.0 | 5.5 | | | 1.0 | 30–35 | 120–130 | 3 | Do. |
| 12f | 11f | 5.5 | 5.5 | 550 | 5.0 | 6.05 | | | 1.1 | 30–35 | 120–130 | 1 | Do. |
| 13f | 12f | 5.5 | 6.05 | 550 | 5.0 | 11.0 | | | 2.0 | 30–35 | 120–130 | 4 | Do. |
| 14f | 13f | 5.5 | 11.0 | 550 | 5.0 | 22.0 | | | 4.0 | 30–35 | 120–130 | 6 | Do. |
| 15f | 14f | 5.5 | 22.0 | 550 | 5.0 | 44.0 | | | 8.0 | 30–35 | 120–130 | 8½ | Do. |

[1] Oxyalkylation-susceptible compound.

TABLE VII

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, as indicated, grams | Catalyst, NaOH, grams | Xylene solvent, grams | Oxide used, as indicated, grams | Weight ratio | | | Max. pres., p.s.i. | Max. temp., °C. | Time of reaction, hrs. | |
| | | | | | | | EtO to oxyalkylation suscept. cmpd.[2] | PrO to oxyalkylation suscept. cmpd.[2] | BuO to oxyalkylation suscept. cmpd.[2] | | | | |
| 1g | 4d | 450 | 0 BuO | 45–0 | 450 | 450 BuO | 3.5 | | 1.0 | 30–35 | 115–120 | 3 | Reddish black vis. liq. |
| 2g | 1g | 450 | 450 | 45–0 | 450 | 900 | 3.5 | | 2.0 | 30–35 | 115–120 | 3 | Do. |
| 3g | 2g | 450 | 900 | 45–0 | 450 | 1,350 | 3.5 | | 3.0 | 30–35 | 115–120 | 3½ | Do. |
| 4g | 3g | 450 | 1,350 | 45–0 | 450 | 1,575 | 3.5 | | 3.5 | 30–35 | 115–120 | 2¾ | Do. |
| 5g | 4g | 450 | 1,575 | 45–0 | 450 | 2,250 | 3.5 | | 5.0 | 30–35 | 115–120 | 4 | Do. |
| 6g | 5e | 450 | 0 EtO | 45–0 | 450 | 900 EtO | 2.0 | 20.0 | | 30–35 | 115–120 | 1½ | Dark amber vis. liq. |
| 7g | 6g | 450 | 900 | 45–0 | 450 | 1,800 | 4.0 | 20.0 | | 30–35 | 115–120 | 2 | Do. |
| 8g | 7g | 450 | 1,800 | 45–0 | 450 | 2,700 | 6.0 | 20.0 | | 30–35 | 115–120 | 3 | Do. |
| 9g | 8g | 450 | 2,700 | 45–0 | 450 | 2,925 | 6.5 | 20.0 | | 30–35 | 115–120 | 1½ | Do. |
| 10g | 9g | 450 | 2,925 | 45–0 | 450 | 3,150 | 7.0 | 20.0 | | 30–35 | 115–120 | 2 | Do. |
| 11g | 15f | 900 | 0 PrO | 90–0 | 820 | 3,600 PrO | | 4.0 | 8.0 | 30–35 | 115–120 | 5 | Reddish black vis. liq. |
| 12g | 11g | 900 | 3,600 | 90–0 | 820 | 7,200 | | 8.0 | 8.0 | 30–35 | 115–120 | 5¼ | Do. |
| 13g | 12g | 450 | 3,600 | 45–0 | 410 | 7,200 | | 16.0 | 8.0 | 30–35 | 115–120 | 6 | Do. |
| 14g | 13g | 225 | 3,600 | 22–5 | 205 | 4,500 | | 20.0 | 8.0 | 30–35 | 115–120 | 4 | Do. |
| 15g | 14g | 225 | 4,500 | 22–5 | 205 | 4,625 | | 25.0 | 8.0 | 30–35 | 115–120 | 1¾ | Do. |

[1] Oxyalkylation-susceptible compound.
[2] Weight ratio based on original oxyalkylation-susceptible compounds prior to any oxyalkylation.

TABLE VIII

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, as indicated, grams | Catalyst, NaOH, grams | Xylene solvent, grams | Oxide used, as indicated, grams | Weight ratio | | | Max. pres., p.s.i. | Max. temp., °C. | Time of reaction, hrs. | |
| | | | | | | | EtO to oxyalkylation suscept. cmpd.[2] | PrO to oxyalkylation suscept. cmpd.[2] | BuO to oxyalkylation suscept. cmpd.[2] | | | | |
| 1h | 5g | 450 | 0 PrO | 45.0 | 450 | 3,825 PrO | 3.5 | 8.5 | 5.0 | 30–35 | 115–120 | 8½ | Reddish black vis. Liq. |
| 2h | 1h | 225 | 1,912.5 | 22.5 | 225 | 2,250 | 3.5 | 10.0 | 5.0 | 30–35 | 115–120 | 2¾ | Do. |
| 3h | 2h | 225 | 2,250 | 22.5 | 225 | 2,700 | 3.5 | 12.0 | 5.0 | 30–35 | 115–120 | 3 | Do. |
| 4h | 3h | 225 | 2,700 | 22.5 | 225 | 3,375 | 3.5 | 15.0 | 5.0 | 30–35 | 115–120 | 3 | Do. |
| 5h | 4h | 225 | 3,375 | 22.5 | 225 | 4,050 | 3.5 | 18.0 | 5.0 | 30–35 | 115–120 | 3½ | Do. |
| 6h | 10g | 225 | 0 BuO | 22.5 | 225 | 225 BuO | 7.0 | 20.0 | 1.0 | 30–35 | 115–120 | 2 | Dk. amber vis. liq. |
| 7h | 6h | 225 | 225 | 22.5 | 225 | 450 | 7.0 | 20.0 | 2.0 | 30–35 | 115–120 | 2 | Do. |
| 8h | 7h | 225 | 450 | 22.5 | 225 | 675 | 7.0 | 20.0 | 3.0 | 30–35 | 115–120 | 2½ | Do. |
| 9h | 8h | 225 | 675 | 22.5 | 225 | 900 | 7.0 | 20.0 | 4.0 | 30–35 | 115–120 | 3 | Do. |
| 10h | 9h | 225 | 900 | 22.5 | 225 | 1,575 | 7.0 | 20.0 | 7.0 | 30–35 | 115–120 | 4¾ | Do. |
| 11h | 15g | 225 | 0 EtO | 22.5 | 205 | 450 EtO | 2.0 | 25.0 | 8.0 | 30–35 | 115–120 | 1½ | Reddish black vis. liq. |
| 12h | 11h | 225 | 450 | 22.5 | 205 | 900 | 4.0 | 25.0 | 8.0 | 30–35 | 115–120 | 2 | Do. |
| 13h | 12h | 225 | 900 | 22.5 | 205 | 1,125 | 5.0 | 25.0 | 8.0 | 30–35 | 115–120 | 2¾ | Do. |
| 14h | 13h | 225 | 1,125 | 22.5 | 205 | 1,350 | 6.0 | 25.0 | 8.0 | 30–35 | 115–120 | 2 | Do. |
| 15h | 14h | 225 | 1,350 | 22.5 | 205 | 1,800 | 8.0 | 25.0 | 8.0 | 30–35 | 115–120 | 3 | Do. |

[1] Oxyalkylation-susceptible compound.
[2] Weight ratio based on original oxyalkylation-susceptible compounds prior to any oxyalkylation.

PART 7

As to the use of conventional demusifying agents reference is made to U. S. Patent No. 2,626,929, dated January 7, 1953, to De Groote, and particularly to Part Three. Everything that appears therein applies with equal force and effect to the instant process, noting only that where reference is made to Example 13b in said text beginning in column 15 and ending in column 18, reference should be to Example 5d, herein described.

Having thus described my invention what I claim as new and desire to secure by Letters Patent is:

1. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first esterifying (A) a carboxylated phenol-aldehyde resin, and (B) an amine-modified phenol-aldehyde resin; said carboxylated resin (A) being a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

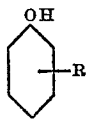

in which R is a hydrocarbon radical having at least 4 and not more than 14 carbon atoms and substituted in one of the positions ortho and para; said amine-modified phenol-aldehyde resin (B) being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methyloi forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

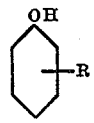

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the further proviso that the molar ratio of reactants (a), (b), and (c) be approximately 1, 2 and 2, respectively; and with the further proviso that the resinous condensation product resulting from the process be heat-stable, oxyalkylation-susceptible and contain at least two alkanol radicals; and with the final proviso that the product of esterification be thermoplastic and organic solvent-soluble; followed by a second step of reacting said condensate with an alpha-beta alkylene oxide having not more than 4 carbon atoms and selected from the class consisting of ethylene oxide, propylene oxide, butylene oxide, glycide and methylglycide.

2. The process of claim 1 with the proviso that the carboxylated resin molecule have approximately 5 phenolic nuclei of which not over 2 are obtained from salicylic acid.

3. The process of claim 1 with the proviso that the carboxylated resin molecule have approximately 5 phenolic nuclei of which 2 are obtained from salicylic acid.

4. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1.

5. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from a dialkanolamine.

6. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from a dialkanolamine having not over 6 carbon atoms in the alkanol group.

7. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of diethanolamine as a reactant.

8. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dipropanolamine as a reactant.

9. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dibutanolamine as a reactant.

10. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dihexanolamine as a reactant.

References Cited in the file of this patent

UNITED STATES PATENTS

| | | |
|---|---|---|
| 2,454,545 | Bock et al. | Nov. 23, 1948 |
| 2,457,634 | Bond et al. | Dec. 28, 1948 |
| 2,558,688 | Landa | June 26, 1951 |
| 2,571,118 | De Groote et al. | Oct. 16, 1951 |
| 2,589,200 | Monson | Mar. 11, 1952 |
| 2,679,484 | De Groote | May 25, 1954 |